United States Patent [19]

Boersma

[11] 4,210,362
[45] Jul. 1, 1980

[54] OPERATOR'S COMPARTMENT AND SEAT MOUNTING

[75] Inventor: Richard F. Boersma, Springfield, Ill.

[73] Assignee: Fiat-Allis Construction Machinery, Inc., Deerfield, Ill.

[21] Appl. No.: 946,516

[22] Filed: Sep. 28, 1978

[51] Int. Cl.² ............................................. B62D 27/04
[52] U.S. Cl. .................................. 296/190; 180/89.13
[58] Field of Search ................. 296/102, 190; 280/748, 280/756; 180/89.13, 89.14, 89.15, 89.16, 89.18, 89.19

[56] References Cited

U.S. PATENT DOCUMENTS

| Re. 29,123 | 1/1977 | Malm | 180/89.12 |
|---|---|---|---|
| 3,527,474 | 9/1970 | Boersma | 280/748 |
| 3,612,581 | 10/1971 | Frankenberg | 296/102 |
| 4,023,851 | 5/1977 | Palmer | 296/102 |
| 4,050,733 | 9/1977 | Borrill | 280/756 |
| 4,050,735 | 9/1977 | Molnar | 296/102 |
| 4,077,655 | 3/1978 | Skahill | 280/756 |

*Primary Examiner*—John J. Love
*Assistant Examiner*—John A. Carroll
*Attorney, Agent, or Firm*—August E. Roehrig, Jr.; Robert A. Brown

[57] ABSTRACT

An operator's compartment mount which isolates the operator's compartment from the vehicle frame. The operator's seat mount and roll-over protective structure rear mount are secured directly to the vehicle frame. The front portion of the roll-over protective structure is mounted directly to the operator's compartment and the rear portion is isolation mounted to the vehicle frame.

9 Claims, 8 Drawing Figures

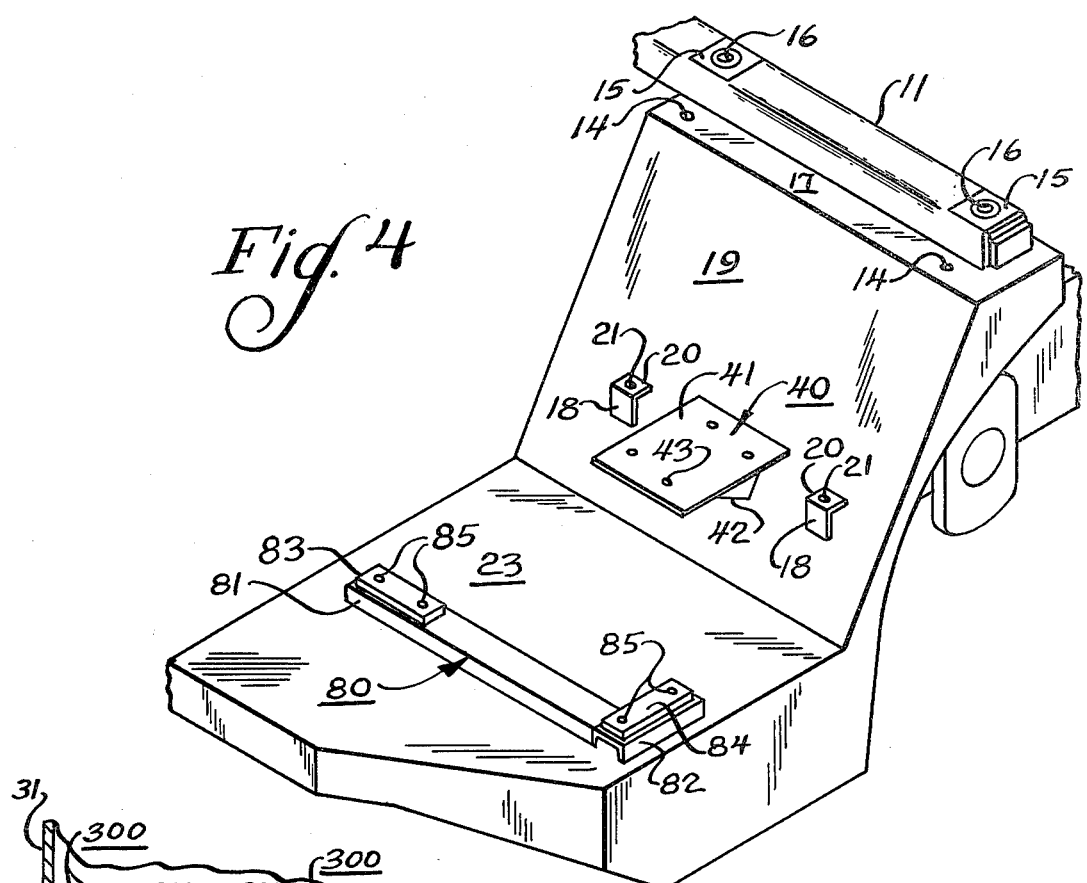
Fig. 4
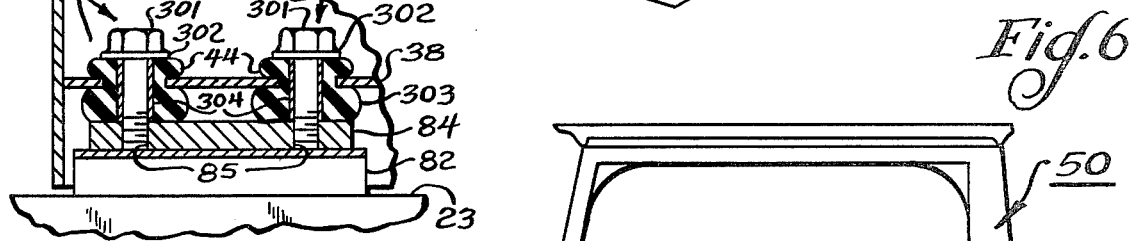
Fig. 8
Fig. 6
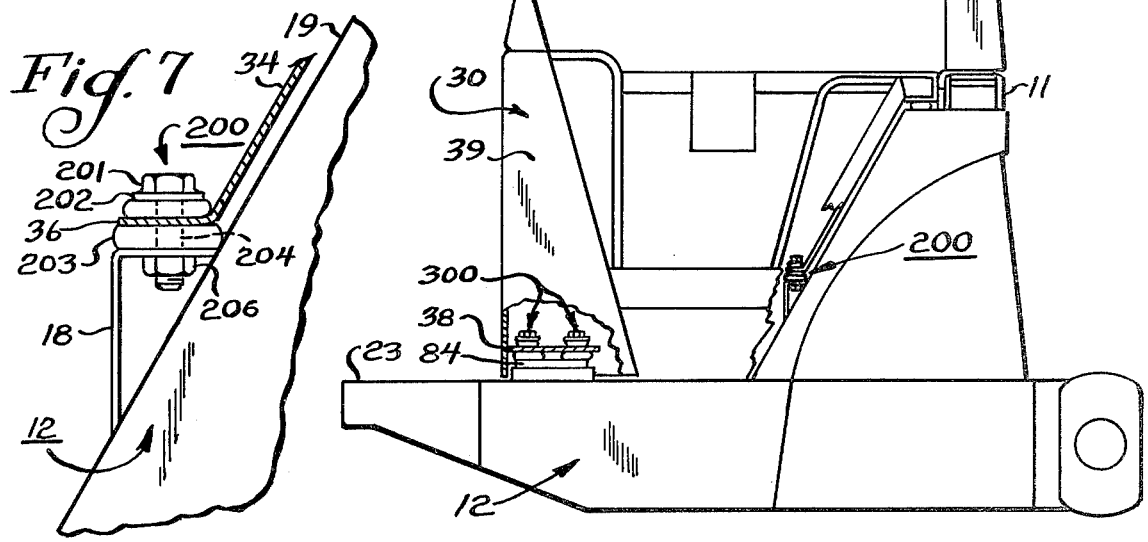
Fig. 7

OPERATOR'S COMPARTMENT AND SEAT MOUNTING

BACKGROUND OF THE INVENTION

This invention relates in general to vehicle operator compartments and, in particular, to mounting an operator's compartment to a vehicle in a manner which reduces the operator's exposure to noise, shock and vibration.

More specifically, but without restriction to the particular use which is shown and described, this invention relates to an operator's compartment which is mounted to a vehicle frame in a manner designed to isolate the compartment from the frame, thereby reducing the transmission of noise, vibration, and shock from the vehicle frame to the compartment. The invention has provisions for anchoring the operator's seat mounting directly to the frame and for equipping the vehicle with a roll-over protective structure, an environmental cab, and the like. While this invention has general application for reducing noise, shock and vibration, for convenience of illustration the preferred embodiment will be described with reference to an operator's compartment of an earthmoving vehicle, although it is not intended to be limited thereto.

Typically, operators of earthmoving equipment are exposed to varying degrees of noise, shock and vibration caused by the vehicle engine and hydraulic operating systems, ground contact, and movement over uneven terrain. Due to the harmful effect on operators who are exposed to the aforesaid conditions over prolonged periods, legislation intended to improve operator comfort and safety has been passed. Typically such legislation limits vehicular noise emission levels and requires that equipment be fitted with roll-over protective structures (ROPS) or rollbars, as shown in the inventor's patent, U.S. Pat. No. 3,527,474. Attempts to provide a solution to the excessive noise problem include requiring that the operator wear ear plugs or noise-suppressing ear muffs, using various engine muffling devices, or surrounding the engine compartment with a noise-suppressing enclosure. Another solution has been to isolate the operator within a cab or compartment as is disclosed in U.S. Pat. No. 4,023,851, which, in addition, may be fully enclosed and insulated with sound absorbing material. While these solutions, whether used alone or in combination, significantly reduce operator exposure to noise, they have not been satisfactory solutions to the multiple problem of noise, shock, and vibration transmission directly from the vehicle frame to the operator compartment, roll-over protective structure or environmental cab.

The present invention is an operator's compartment mount which isolates the operator's compartment from the vehicle frame. The ROPS rear mount is an integral part of the frame, and the operator's seat mount is secured directly to the frame. To attain these objectives the front portion of the ROPS canopy is mounted directly to the operator's compartment, and the rear portion is isolated from the frame.

SUMMARY OF THE INVENTION

It is, therefore, an object of this invention to improve vehicle operator enclosures.

Another object of this invention is to improve operator comfort and safety.

A further object of this invention is to reduce the transmission of noise, shock, and vibration from the vehicle frame to the operator's compartment.

Yet another object of this invention is to reduce transmission of noise, shock and vibration from the vehicle frame to the roll-over protective structure.

Still another object of this invention is to isolate the operator's compartment from the vehicle frame.

A still further object of this invention is to reduce transmission of noise, shock, and vibration from the vehicle frame to the environmental cab.

Still another object of this invention is to secure the operator's seat mount directly to the vehicle frame.

These and other objects are attained in accordance with the present invention wherein there is provided an operator's compartment mount which isolates the operator's compartment from the vehicle frame. The operator's seat mount and roll-over protective structure rear mount are secured directly to the vehicle frame. The front portion of the roll-over protective structure is mounted directly to the operator's compartment and the rear portion is isolation mounted to the vehicle frame.

DESCRIPTION OF THE DRAWINGS

Further objects of this invention, together with additional features contributing thereto and advantages accruing therefrom will be apparent from the following description of a preferred embodiment of the invention which is shown in the accompanying drawings with like reference numerals indicating corresponding parts throughout, wherein:

FIG. 4 is a perspective view of a portion of a vehicle frame illustrating the operator's seat mount, the roll-over protective structure rear mount, and the operator's compartment mounts;

FIG. 6 is a side elevational view of a portion of an earthmoving vehicle having an operator's compartment and a rollover protective structure mounted thereon with portions cut away to better illustrate the manner in which the compartment is mounted upon a vehicle frame;

FIG. 7 is an enlarged view of a cut-away portion of FIG. 6 illustrating the manner in which the mid portion of the operator's compartment is mounted to and isolated from the vehicle frame; and FIG. 8 is an enlarged partial sectional view taken along line 8—8 of FIG. 3 to better illustrate the manner in which the forward portion of the operator's compartment is mounted to and isolated from the vehicle frame as also shown in the cut-away portion of FIG. 6.

DESCRIPTION OF THE PREFERRED EMBODIMENT OF THE INVENTION

Figure 1:
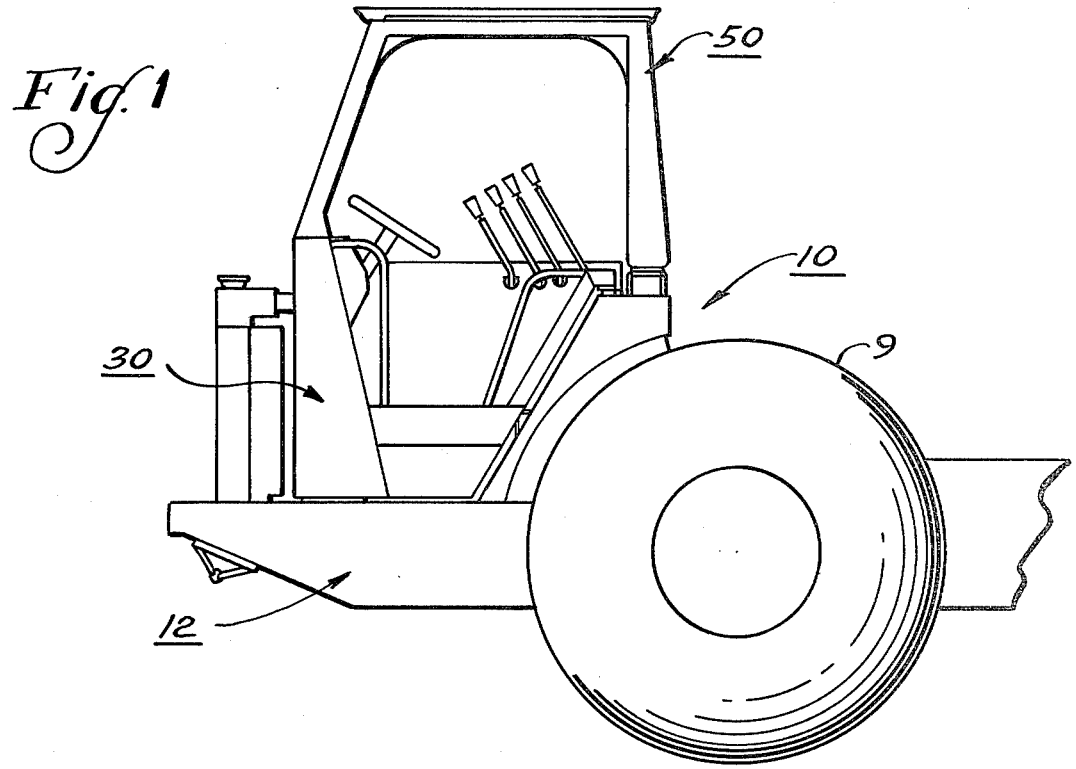
FIG. 1 is a side elevational view of the front portion of an earthmoving vehicle having an operator's compartment and a roll-over protective structure mounted thereon.
Figure 2:
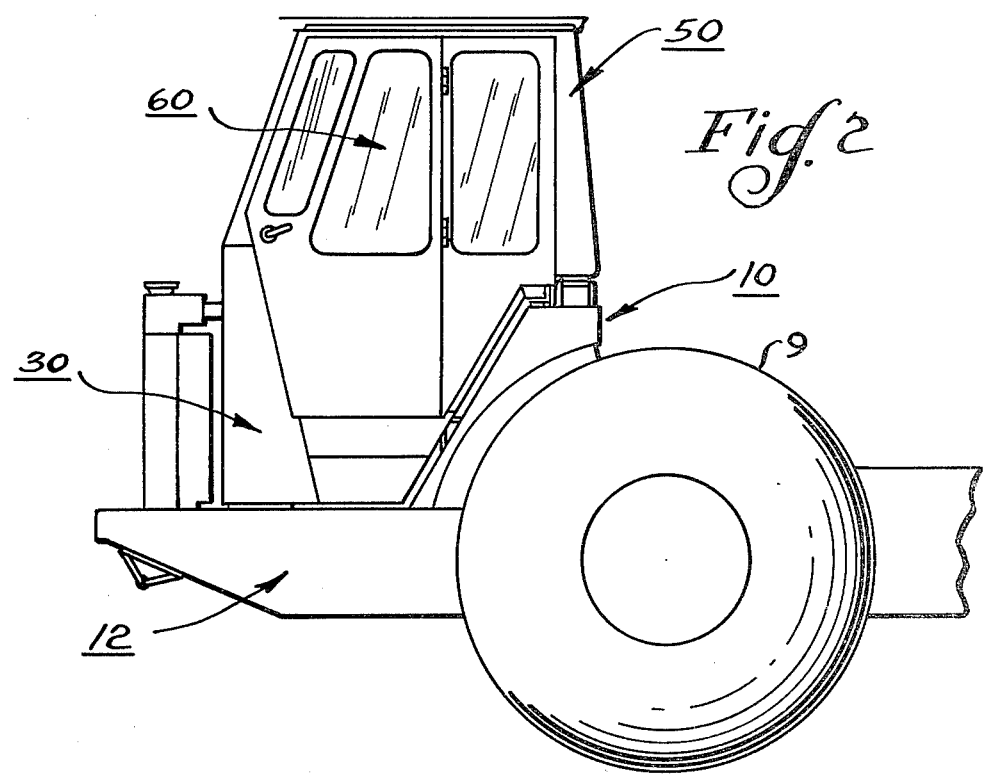
FIG. 2 is a side elevational view similar to FIG. 1 illustrating the earthmoving vehicle equipped with an environmental cab.

Referring now to FIG. 1, there is shown one form of the invention for use with a tractor portion of an earth-moving vehicle such as a wheel scraper. The tractor portion 10 of the scraper has a main frame 12, a plurality of steering and driving wheels 9 (one of which is shown), an operator's compartment 30 and a roll-over protective structure 50, which will hereinafter be referred to as the ROPS assembly. If the vehicle is to be operated under conditions of either extreme cold or heat, the operator's compartment may be enclosed by an environmental cab generally designated by the reference numeral 60 and illustrated in FIG. 2.

To insure the safety of the vehicle operator, it is necessary to secure the operator's compartment 30 and the ROPS assembly 50 to the vehicle frame 12. However, such mountings have resulted in the transmission of annoying sound and vibration from the vehicle frame 12 to these structures. Therefore, to provide the desired safety features for the vehicle operator while minimizing the transmission of sound and vibration, it is desirous to isolate these effects from the operator's compartment 30. While neither the operator's compartment 30 nor the ROPS assembly 50, per se, form a part of the present invention, to better illustrate the manner in which the aforesaid results are achieved the drawings show a portion of the vehicle frame 12 having a ROPS assembly 50 and an operator's compartment 30 mounted thereon.

Figure 3:
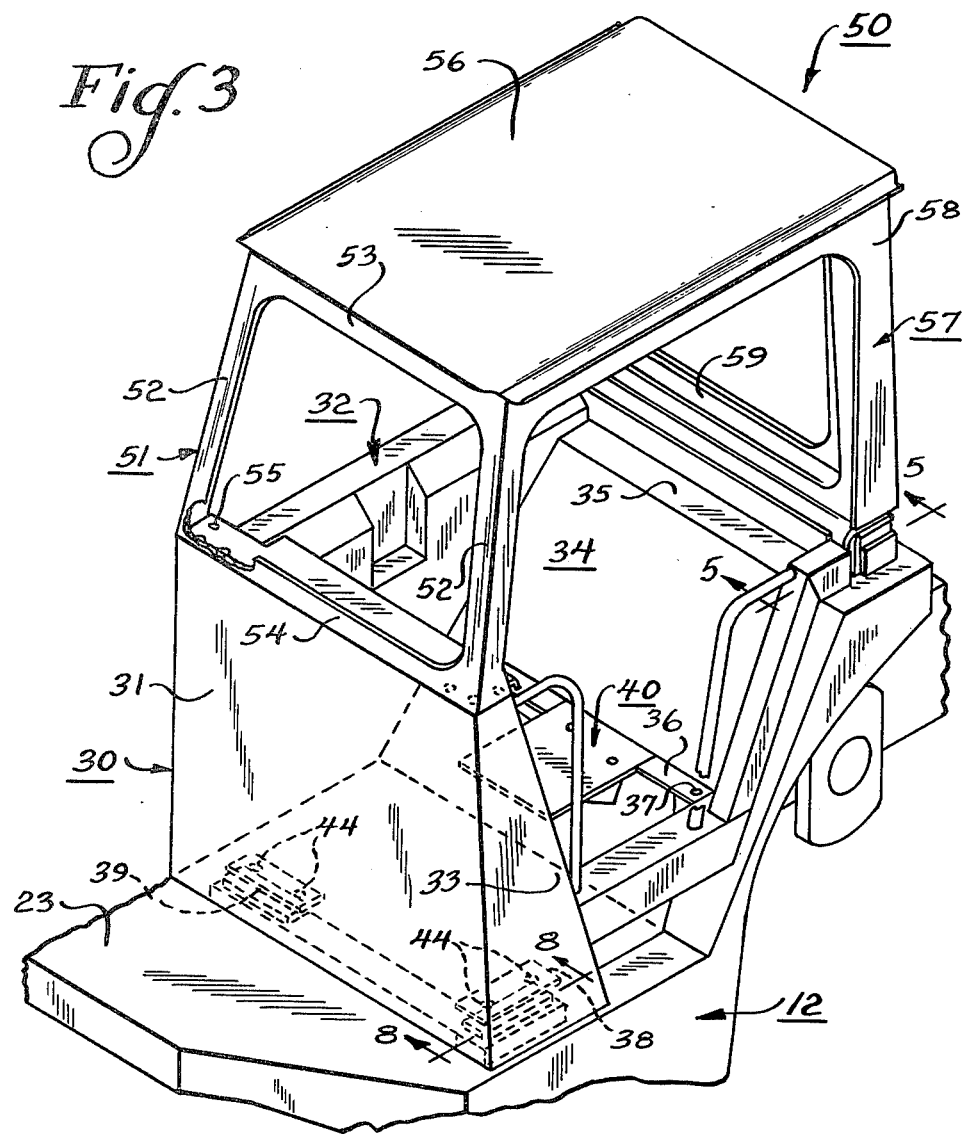
FIG. 3 is a perspective view of a vehicle frame with an operator's compartment and a roll-over protective structure mounted thereon.

Referring now to FIG. 3, the ROPS weld assembly 50 includes a front portion 51 having a pair of upright posts 52 separated by an upper member 53 and a lower member 54. The lower member 54 has a plurality of holes formed therein to receive cap screws 55 which secure the front portion of the ROPS weld assembly 50 to the operator's compartment 30. A top portion 56 of the ROPS weld assembly is formed as a flat plate, and a rear portion 57 comprises a pair of laterally spaced upright posts 58 secured at their uppermost end to the top portion 56 and separated by an upper member and a lower member 59. Member 59 has a pair of holes formed therein which are adapted to hold a socket of fastener assemblies for securing the rear portion of the ROPS assembly to the vehicle frame 12, as will hereinafter be described in more detail.

The operator's compartment 30 is a welded assembly and includes a generally vertically extending front member 31 and generally vertically extending side panels 32 and 33, formed from plate. The side panels 32 and 33 are laterally spaced apart by the front member 31 and a rear panel 34 which extends upwardly from a seat mount 40. The uppermost end of the rear panel 34 terminates in a horizontally extending member 35 which is parallel and adjacent to a portion of the vehicle frame 12.

As will be hereinafter described in greater detail, the operator's compartment 30 is mounted to the frame 12 at its rear portion, its mid portion, and at its forward portion. To this end holes are formed in the horizontal surface 35 of the rear panel 34 and are adapted to receive a pair of suitable fastening assemblies, identified by reference numeral 100 in FIG. 5, for securing the rear portion of the operator's compartment 30 to the vehicle frame 12.

The mid portion mounting members 36, each of which is positioned in the same horizontal plane as the seat mount 40 and immediately adjacent to opposing sides thereof, extend generally outwardly from rear panel 34 and have holes 37 formed therein for receiving a pair of fastener assemblies, identified by reference numeral 200 in FIG. 6, for securing the middle portion of the operator's compartment 30 to the vehicle frame 12.

The forward portion of the operator's compartment 30 has a mounting plate 38 welded to the lowermost portion of both the front member 31 and the side panel 33, and a mounting plate 39 welded to the lowermost portion of the front member 31. Both of the mounting plates 38 and 39 have a pair of holes 44 formed therein which are adapted to receive suitable fastener assemblies, identified by reference numeral 300 in FIG. 8, to secure the front portion of the operator's compartment 30 to the vehicle frame 12.

To best illustrate the manner in which the operator's compartment 30 and the ROPS assembly 50 are secured to the vehicle frame 12, FIG. 4 shows a portion of the vehicle frame 12 with the operator's compartment 30 and the ROPS assembly 50 removed. A generally horizontally extending portion 17 of the vehicle frame 12 has a pair of holes 14 formed therein which are adapted to receive the fastening assemblies 100 (FIG. 5) for attaching the rear portion of the operator's compartment 30 to the vehicle. The ROPS assembly rear mount 11 is secured directly to the horizontally extending portion 17 of the vehicle frame 12. The ROPS assembly rear mount 11 includes mounts 15 having beveled holes 16 formed therein which are adapted to receive fastening assemblies 70 for securing the rear portion of the ROPS weld assembly 50 to the rear mount 11.

Figure 5:
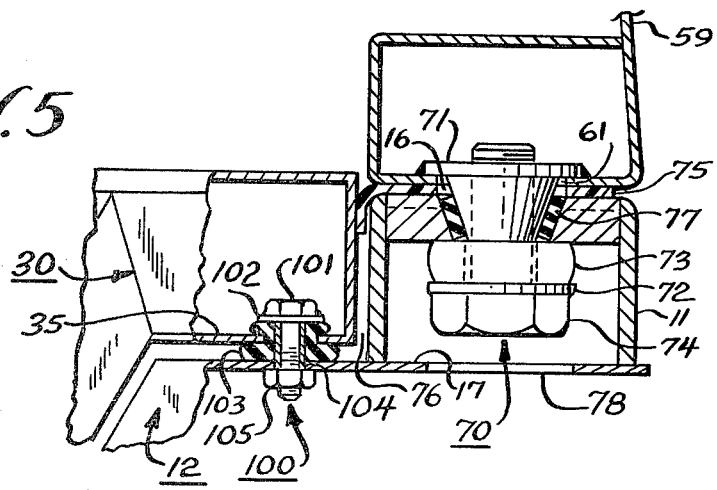
FIG. 5 is an enlarged partial sectional view taken along line 5—5 of FIG. 3 to better illustrate the manner in which the rear portions of the operator's compartment and the roll-over protective structure are mounted to and isolated from the vehicle frame.

The manner in which the rear portion of the ROPS weld assembly 50 and the operator's compartment 30 are mounted to the ROPS assembly rear mount 11 and vehicle frame 12, respectively, is best illustrated in FIG. 5. Lower member 59 of the rear portion of the ROPS weld assembly 50 has holes 61 formed therein which are in alignment with beveled holes 16 formed in the rear mount 11 and cooperate therewith in receiving the tapered socket 71 of a fastening assembly 70.

Each of the fastening assemblies 70 includes a washer 72, a vibration absorbing pad 73, and a cap screw 74. Vibration absorbing material, in the form of an elastomeric sheet 75, is disposed between the rear portion of the ROPS lower member 59 (which has the tapered sockets 71 welded thereto) and the ROPS rear mount 11, and extends the length thereof. A portion of the elastomeric sheet 75 extends downwardly into the space 76 between the ROPS rear mount 11 and the rear of the operator's compartment 30 to prevent any direct contact between the two structures. Vibration absorbing material in the form of elastomeric strips 77 are placed within the beveled holes 16 and are disposed between the tapered sockets 71 and the ROPS assembly rear mount 11, thereby preventing any direct contact between the tapered sockets 71 and the ROPS rear mount 11. The vibration absorbing pad 73 is positioned between the ROPS assembly rear mount 11 and washer 72 to further attenuate vibrations emanating from the vehicle frame 12 and transmitted to the ROPS rear mount 11. The sockets 71 prevent side loading against the fastening cap screw 74 during an actual roll-over, eliminating cap screw shear stress, while maintaining a vibration absorbing connection. Access holes 78 are formed in the surface 17 of the vehicle frame 12 to facilitate the assembly of the above described connection by providing access to the interior of the ROPS rear mount 11. In a similar manner holes formed in the horizontal surface 35 of the rear of the operator's compartment 30 are in alignment with the holes 14 formed in the generally horizontally extending surface 17 of the vehicle frame 12 and cooperate therewith in receiving one of a plurality of fastening assemblies 100. Each of the fastening assemblies 100, one of which is shown in FIG. 5, comprises a bolt 101, a washer 102, a vibration absorbing pad 103 of elastomeric material having an internal rigid sleeve 104 preferably bonded to the elastomeric material, and a nut 105. The vibration absorbing pad 103, the sleeve 104 of which has an internal diameter larger than the shank of bolt 101, is inserted over the shank of bolts 101, with pad 103 disposed between the horizontal member 35 of the operator's compartment 30 and the surface 17 of the vehicle frame 12. A portion of pad 103 is disposed between the member 35 and the washer 102 adjacent the head of bolt 101. The washer 102 prevents damage to the vibration absorbing pad 103 by providing a fixed connection of the forces exerted by the bolts 101 which secure the rear portion of the operator's compartment 30 to the vehicle frame 12, through the solid connection formed with the sleeve 104 when the bolt 101 and nut 105 are tightened.

The mounting brackets which secure the middle portion of the operator's compartment 30 to the vehicle frame 12, are best illustrated in FIG. 4. A pair of brackets 18 are secured to a surface 19 of the vehicle frame 12 which extends generally vertically downwardly in a slightly inclined plane from surface 17 toward a horizontal surface 23 of the vehicle frame 12. The brackets are positioned on each side of an operator's seat mount 40, with the top surface 20 of each bracket lying in a plane generally parallel to and slightly below the top surface of the seat mount 40. Each of the surfaces 20 has at least one hole 21 formed therein to receive fastening assemblies 200 (FIG. 7) for securing the middle portion of the operator's compartment 30 thereto.

The operator of an earthmoving vehicle is generally seated upon a cushion, typically formed of foam rubber or like material and, therefore, it is not necessary to isolate the seat mount from the vehicle frame 12. The seat mount, best shown in FIGS. 3 and 4, is shown generally by the numeral 40 and is welded directly to surface 19 of the vehicle frame 12. The seat mount 40 comprises a plate 41 and a supporting brace 42. The plate 41 has a plurality of holes 43 formed therein which are adapted to receive fasteners, not shown in the drawings, for securing cushion material and the like to the seat mount 40.

The manner in which the middle portion of the operator's compartment 30 is secured to the mounting brackets 18, is shown generally in FIG. 6 and illustrated in detail in FIG. 7. A plurality of holes 37, one of which is shown in FIG. 7, formed in each of the mid portion mounting member 36 extending generally outwardly from rear panel 34 of operator's compartment 30 are in alignment with holes 21 formed in mounting brackets 18 and cooperate therewith in receiving mid portion fastening assemblies 200. Each of the fastening assemblies 200 comprises a bolt 201, a washer 202, a vibration absorbing pad 203 of elastomeric material having an internal rigid sleeve 204 preferably bonded to the elastomeric material, and a nut 206. The vibration absorbing pad 203, the sleeve 104 of which has an internal diameter larger than the shank of bolt 201, is inserted over the shanks of the bolts 201 with a portion of pad 203 disposed between bracket 18 and bracket 36, and another portion of pad 203 is disposed between the generally outwardly extending mid portion mounting member 36 and a second force distributing washer 202 positioned adjacent the head of the bolt 201.

The forward mount 80 for the operator's compartment is best illustrated in FIG. 4 and comprises a pair of channels 81 and 82 secured to the horizontal surface 23 which extends beneath and parallel to the plane of the surface 17. The mounting plates 83 and 84 are secured to the channels 81 and 82, respectively, as shown. A plurality of threaded holes 85 extend through both the plates 83 and 84, and are adapted to receive one of a plurality of fastening assemblies 300 which secure the operator's compartment 30 thereto.

The manner in which the forward portion of the operator's compartment 30 is secured to the forward mount 80 is shown generally in FIGS. 3 and 6 and illustrated in greater detail in FIG. 8. A pair of holes 44, formed in the mounting plate 38 which is secured to the operator's compartment 30, cooperate with threaded holes 85 formed in the forward mount 80 (FIG. 4) in receiving a pair of fastening assemblies 300. Each of the fastening assemblies 300 comprises a cap screw 301, a washer 302, and a vibration absorbing pad 303 of elastomeric material having an internal rigid sleeve 304 preferably bonded to the elastomeric material. The vibration absorbing isolation pad 303, the sleeve 304 of which has an internal diameter larger than the shank of cap screw 301, is inserted over the shanks of each of the cap screws 301 with one portion of pad 303 disposed between the mounting plates 38 and 84, and the other portion of pad 303 between the mounting plate 38 and the washer 302 positioned adjacent the head of each of the cap screws 301. As with fastening assemblies 100 and 200, the washer 302 permits a rigid tightening of the cap screw 301 into the threaded hole 305 through the rigid sleeve 304 while permitting the elastomeric material to perform the vibration isolation function. The forward portion of the operator's compartment 30 is secured to the forward mount 80 by the mounting plates 39 and 83 in an identical manner as hereinbefore described with reference to the mounting plates 38 and 84.

While the invention has been described with reference to a preferred embodiment it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore it is intended that the invention not be limited to the particular embodiment disclosed as the best mode contemplated for carrying out this invention but that the invention will include all embodiments falling within the scope of the appended claims.

What is claimed is:

1. A mount for supporting an operator's compartment on a vehicle frame comprising
an operator's compartment supported on the vehicle frame,
securement means to fasten the operator's compartment to the vehicle frame at a plurality of support points, and
said securement means including isolation means operatively positioned adjacent said support points to isolate operator's compartment from noise and vibration induced on the vehicle frame during operation of the vehicle, said isolation means includes a plurality of vibration absorption pads respectively situated between the operator's compartment and the vehicle frame at said plurality of support points, said securement means further includes a plurality of fastening members adapted to support the pads in coupling relationship to the operator's compartment and the vehicle frame, said operator's compartment and vehicle frame each including retention means receiving said fastening members to fasten the operator's compartment to the vehicle frame, said retention means of the vehicle frame includes a forward pair of mounting brackets, said mounting brackets having at least two openings for receiving a respective fastening member in coupling relationship, and said at least two openings of one of said mounting brackets being aligned along an axis lying substantially perpendicular to an axis passing through said at least two openings of said other mounting bracket.

2. The vehicle of claim 1 wherein said operator's compartment includes a roll-over protection device, said roll-over protection device being attached to the operator's compartment and the vehicle frame, fastening means to secure the roll-over protective device to the vehicle frame, and said fastening means including additional isolating means to isolate the roll-over protection device from the noise and vibration induced on the vehicle frame during operation of the vehicle.

3. The vehicle of claim 1 wherein the vehicle frame includes a seat mount.

4. The vehicle of claim 1 wherein said isolating means further includes at least one vibration absorption pad positioned adjacent a rear portion of the operator's compartment.

5. A mounting for supporting an operator's compartment on a vehicle frame comprising an operator's compartment supported on the vehicle frame, securement means to fasten the operator's compartment to the vehicle frame at a plurality of support points, said securement means including isolation means operatively positioned adjacent said support points to isolate the operator's compartment from noise and vibration induced on the vehicle frame during operation of the vehicle, said operator's compartment includes a roll-over protection device, said roll-over protection device being attached to the operator's compartment and the vehicle frame, fastening means to secure said roll-over protection device to the vehicle frame, said fastening means including additional isolating means to isolate said roll-over protection device from the noise and vibration induced on the vehicle frame during operation of the vehicle, said fastening means includes at least one fastening assembly to attach said roll-over protection device to the vehicle frame, and said additional isolating means having a vibration absorption pad supported by said fastening assembly.

6. The vehicle of claim 5 wherein said fastening assembly includes a socket extending through the roll-over protection device and the vehicle frame, said socket supporting a washer, said washer being displaceable toward an elastomeric pad in response to vibrations induced on the frame, and said vibration absorption pad being positioned between said washer and frame.

7. The vehicle of claim 5 wherein the vibration absorption pad is physically imposed between the roll-over protection device and the vehicle frame.

8. The vehicle of claim 7 wherein the vibration absorption pad further is physically imposed between the operator's compartment and the vehicle frame.

9. A mount for supporting an operator's compartment on a vehicle frame comprising an operator's compartment supported on the vehicle frame, securement means to fasten the operator's compartment to the vehicle frame at a plurality of support points, and said securement means including isolation means operatively positioned adjacent said support points to isolate the operator's compartment from noise and vibration induced on the vehicle frame during operation of the vehicle, said isolation means includes a plurality of vibration absorption pads respectively situated between the operator's compartment and the vehicle frame at said plurality of support points, said securement means further includes a plurality of fastening members adapted to support the pads in coupling relationship to the operator's compartment and the vehicle frame, said vibration absorption pads each having a pair of enlarged spaced end portions, one of said enlarged end portions having oppositely disposed surfaces contacting said operator's compartment and said vehicle frame respectively, and the other of said end portions having oppositely disposed surfaces contacting said operator's compartment and said fastening members respectively.

* * * * *